United States Patent
Kocher et al.

(10) Patent No.: US 8,949,271 B2
(45) Date of Patent: Feb. 3, 2015

(54) METHOD FOR MONITORING A NUMBER OF MACHINES AND MONITORING SYSTEM

(71) Applicant: Liebherr-Werk Nenzing GmbH, Nenzing (AT)

(72) Inventors: Michael Kocher, Bludenz (AT); Martin Rajek, Thueringen (AT)

(73) Assignee: Liebherr-Werk Nenzing GmbH, Nenzing (AT)

( * ) Notice: Subject to any disclaimer, the term of this patent is extended or adjusted under 35 U.S.C. 154(b) by 117 days.

(21) Appl. No.: 13/658,438

(22) Filed: Oct. 23, 2012

(65) Prior Publication Data

US 2014/0115002 A1   Apr. 24, 2014

(51) Int. Cl.
  *G06F 17/30*   (2006.01)

(52) U.S. Cl.
  USPC ........................................ 707/776

(58) Field of Classification Search
  USPC ................................. 707/672, 776
  See application file for complete search history.

(56) References Cited

U.S. PATENT DOCUMENTS

| | | | | |
|---|---|---|---|---|
| 3,849,760 A | * | 11/1974 | Endou et al. ........... | 382/205 |
| 7,647,356 B2 | * | 1/2010 | Gupta ...................... | 707/999.2 |
| 7,815,106 B1 | * | 10/2010 | McConnell ............. | 235/380 |
| 8,296,269 B2 | * | 10/2012 | Pareek et al. ........... | 707/672 |
| 2005/0010504 A1 | * | 1/2005 | Gebhard et al. ........ | 705/34 |
| 2005/0242169 A1 | * | 11/2005 | Michal, III ............. | 235/375 |
| 2006/0184529 A1 | * | 8/2006 | Berg et al. .............. | 707/8 |
| 2007/0118297 A1 | * | 5/2007 | Thayer ................... | 702/21 |
| 2007/0255545 A1 | * | 11/2007 | Pita et al. ............... | 703/10 |
| 2008/0126538 A1 | * | 5/2008 | Uyama et al. .......... | 709/224 |
| 2012/0054246 A1 | * | 3/2012 | Fischer .................. | 707/793 |
| 2012/0143893 A1 | * | 6/2012 | Abraham ................ | 707/769 |
| 2013/0013777 A1 | * | 1/2013 | Krywaniuk ............. | 709/225 |
| 2013/0103638 A1 | * | 4/2013 | Gupta et al. ............ | 707/603 |
| 2013/0346447 A1 | * | 12/2013 | Wu et al. ................ | 707/776 |

* cited by examiner

*Primary Examiner* — Cam-Linh Nguyen (74) *Attorney, Agent, or Firm* — Alleman Hall McCoy Russell & Tuttle LLP (57) ABSTRACT

The present disclosure is related to a method for monitoring at least one event data generating machine, including a data logging device for providing event data. The method comprises transferring logged event data from at least one of the event data generating machines to a central processor, mining a multi-dimensional sequential pattern within said transferred event data wherein at least one dimensional attribute holds information indicating said event data generating machine or the at least one event data generating machine property, and matching said mined multi-dimensional sequential pattern with patterns stored in a central pattern database.

20 Claims, 2 Drawing Sheets

FIG. 1

METHOD FOR MONITORING A NUMBER OF MACHINES AND MONITORING SYSTEM

TECHNICAL FIELD

The present disclosure refers to a method for monitoring at least one machine, for instance a construction or a hoisting machine, having data logging means for providing event data.

BACKGROUND AND SUMMARY

These days, acquiring data is more popular than ever before. It ranges from commercial applications, e.g. super market transactions, stock market recordings to scientific data collections, such as genome analysis, astronomy and weather observations or nuclear experiments, to name a few. Hence, data appears in many forms and grows explosively.

Nowadays, companies and organizations generate terabytes of event data on a daily basis. For instance, state of the art machines, such as constructing or hoisting machines, employ a data logging software on its PLC (Programmable Logic Controller), that records event data generated by running programs and sensors. This data enables skilled persons to monitor the status of the machine. Hence, the ability to store and monitor event data records on a permanent basis has become a necessity for detecting malicious behaviour, hazard states and other security issues.

Due to its magnitude and to its complex nature, the analysis of data is no longer feasible by a human being. Therefore, it is desirable to provide methods for automatically monitoring and analyzing the collected event data in order to observe performance degradation or technical issues of the monitored machines.

At the moment, several methods and algorithms exist that detect or mine interesting relations, patterns and hidden knowledge in our data. The formal term for this process of extracting interesting, non-trivial, implicit, previously unknown and potentially useful information or patterns from large information repositories, e.g. a database, is denoted as data mining.

Data mining forms the core process of Knowledge Discovery in Database (KDD). KDD consists of three consecutively applied processes. A first step is called pre-processing and implements data cleansing, integration, selection and transformation methods. Then, the main process, i.e. data mining, applies different algorithms to detect implicit knowledge. Finally, the post-processing step evaluates the mining results according to the user given constraints and requirements.

In case the data has a temporal or sequential nature, i.e. the order in which the elements appear is relevant, a set of special algorithms is designed to detect sequential patterns.

Many known methods for monitoring machines only involve mining of a single dimension event data making it difficult to find common patterns in a selection of machines or similar patterns for machines of a product family.

It is one object of the present disclosure to improve and extend existing methods for monitoring machines, in particular to adapt these methods for being applicable to machine fleets with different but similar machine types. It is a further object of the present disclosure to provide a system for centrally monitoring and diagnosing machine events and machine states in order to improve customer service.

In accordance with the present disclosure, one object is solved by a method with the features of claim 1.

Accordingly, there is provided a method for monitoring at least one machine, in particular a construction or hoisting machine. Preferably, the method is for monitoring a plurality of machines, such as a machine fleet, having identical and/or at least two different but similar machines. All or at least a part of said machines has data logging means for providing event data. For instance, said machine, such as constructing or hoisting machine, employs a data logging software on its machine control that records event data generated by executed applications, functions and programs thereon and/or provided by sensors as measuring results. The machine control can be a Programmable Logic Controller (PLC) executing a data logging software.

Preferably at least one machine can be a port crane or a deck crane.

The inventive method comprises the steps of transferring event data from at least one of the machines to a central processor, mining a multi-dimensional sequential pattern within said transferred event data wherein at least one dimensional attribute holds information indicating said event data generating machine or at least one machine property, in particular the product family of the event data generating machine, and matching said mined multi-dimensional sequential pattern with patterns stored in a central pattern database.

The central processing is part of a central computer, which may be a portable or a laptop computer or a mainframe or a network server or another computer configuration.

At least between one machine and said central processing unit a communicative connection is permanently established or can be temporarily established for data transfer. The connection can be based on wireline or wireless connection using an own or present network, in particular a mobile communication network.

The multi-dimensional attributes hold the information indicating said event data generating machine or at least one machine property. For instance at least one attribute contains information on the product family of the pattern generating machine. Mining multi-dimensional sequential patterns enables the central processor to detect patterns in a selection of machines and/or similar patterns within a product family and/or different product families having similar patterns.

At that point, the inventive method is not only applicable for monitoring identical machines. By adding at least one attribute into the sequential patterns it is possible to describe the type and properties of machines supporting said sequential patterns. For example, the sequence patterns hold information about the event itself. Adding more attributes to the multi-dimensional patterns helps to provide additional information about the machine itself, for example at least one attribute describes the machine type, in particular a constructing or hoisting machine, at least one attribute identifies the membership to a special machine family, at least one attribute references the pattern to a special machine part, such as the machine drive, hydraulic system, mechanical parts, hoisting gear, etc.

By means of multi-dimensional sequential pattern mining all relevant relations/patterns within the data can be detected. These patterns present a salient part of the data that needs to be analysed.

The identified patterns are compared to a central pattern databank. Said databank includes a number of known patterns. If the identified pattern matches a known pattern according reactions can be automatically executed. Therefore, it is possible to identify the correlation between the patterns and the hardware of the machine generating event data and thus provide an automatic approach to preventive maintenance.

In an advantageous aspect of the present disclosure a mined multi-dimensional pattern is stored in said database in case it does not match a known stored pattern. This offers the opportunity to upgrade and enlarge said database during real-time processing.

In accordance with another advantageous aspect of the present disclosure, stored patterns in said database are classified, in particular with respect to their severity for the machine operation. For instance, stored patterns are classified in severe patterns characterizing the occurrence of an important and abnormal event which could lead to critical degradation of the machine or operating persons.

Stored patterns can also be classified into less severe patters which do not imply an imminent danger for the machine and operating staff but necessitating appropriate actions in the future.

Further, it can be possible to classify the stored pattern into uncritical patterns characterizing the occurrence of ordinary or regularly recurring events which do not imply any degradation to the machine or operating staff.

Of course, the present disclosure is not restricted to the mentioned categories. It is obvious that an undefined number of categories is possible, allowing a smoother graduation of the pattern classification.

Furthermore, patterns rated as severe can be stored as blacklist patterns and all others can be stored as whitelist patterns.

To provide a very flexible pattern database it might be useful to enable manual insertion of patterns into said pattern database. Several patterns might be explored during development of said machines. Therefore, these patterns should be entered manually into the database during real-time processes.

The general form of event data logged by at least one machine and transferred to said central processing unit consist advantageously of at least one of the following information fields Event ID, Timestamp, Type of Event and Boolean values or values cohering with a very event.

The Event ID can be a unique number referencing an entry of event data into the log file. In principle, the event ID is a consecutive number for the temporally occurring events.

The timestamp gives the exact time of a single event and the "Type of Event" field gives a short description of the occurred and logged event.

An optional field containing a Boolean value can be added for providing additional status information about the event. Such Boolean value might be a flag as "Is event First After Boot" with values "True" or "False" indicating that said event occurred right after a machine restart. The Boolean value also might give information of whether this event is the first one since booting the machine.

Further, said event data can also contain a value field wherein the according value coheres with the event.

A single event record might hold information on the event that occurred on the machine in question at the date, given by the timestamp, plus values describing the event in more detail, e.g. at a special timestamp, the Load Spectrum Counter (LSC) of a hoisting machine were read out, plus the actual values of the LSC. Hence, the event data shows a history of states the machine was in.

For further prosecution of the logged and transferred data it is transformed to a sequence database. Basically, an event data, as described above, simply represents one long sequence. Each occurred event stands for a single item of said sequence. Some items or rather events might be combined to an itemset or eventset. A sequence database consists of several sequences wherein each row of said sequence database can represent a sequence.

A number of several subsequences is obtained by splitting said long sequence, basically all occurred and logged event data. Splitting the long sequence of event data into at least two subsequences representing single entries of the sequence database wherein each subsequence may form a row of said sequence database.

Said data conversion of event data into a sequence database is applied to prepare the recorded event data for the subsequent process of data mining. A certain data structure such as a sequence database can be convenient for executing data mining algorithm.

The splitting can be triggered by logical interruptions, such as a machine restart or a restart of the respective machine or controller parts. Alternatively or additionally, the splitting can be triggered by causal interruptions, in particular a time interval with no occurring events wherein the time interval exceeds a given time threshold.

Said sequence database is referred to as a multi-dimensional sequence database when additional attributes are added to said sequences stored in said database. One possibility for adding multi-dimensional attributes is to form a multi-dimensional database wherein each row represents a multidimensional sequence which consists of the dimensional information of the very sequence or rather subsequence.

Alternatively, it is possible to embed the additional multi-dimensional attributes as new itemsets into the sequences or rather subsequences, called MD-extension of the sequences.

In an advantageous aspect of the present disclosure multi-dimensional mining is based on a Seq-Dim algorithm. Every row in said sequence database can be represented by a multi-dimensional sequence which consists of two parts. The first part includes the dimensional information containing said multi-dimensional attributes. The second part is the sequence containing the event data. Thus, it can be of an advantageous effort to mine for sequential patterns at first and afterwards detect for frequent dimensional patterns.

Alternatively it might make more sense to go for a Dim-Seq algorithm detecting frequent dimensional attributes at first and then mining for sequential patterns in the corresponding sequences.

Another possibility for a pattern mining algorithm is the UniSeq algorithm. Therefore, it is mandatory to embed the additional multi-dimensional attributes into the sequence as new itemsets or rather eventsets, called MD-extension of the sequence. Thus, a sequential database is obtained which can be handled by a sequential mining algorithm, as UniSeq. UniSeq reduces the problem of mining multi-dimensional sequential patterns to mining sequential patterns with one additional itemset. Therefore, it is easy to implement. However, this method becomes inefficient when the number of dimensions increases.

The Seq-Dim algorithm can preferably comprise the steps of mining sequential patterns by a PrefixSpan algorithm firstly and detecting frequent dimensional attributes by a BUC-like algorithm (Bottom Up Computation) afterwards. A BUC algorithm is an efficient iceberg cube computing algorithm wherein said BUC algorithm is slightly amended to be suitable for detecting frequent dimensional attributes.

The adapted BUC-like algorithm may include the following steps:

taking the first dimension and order it alphabetically. Find all entries in this dimension that appear at least as often as minimum support demands wherein the minimum support stands for a certain threshold deciding whether a dimension is rated as a frequent one.

trying to grow these frequent dimensional attributes by taking the corresponding entries of the next dimension and scan for attributes appearing at least as often as minimum support.

By continuing said procedure all frequent dimensions can be detected which contain an item in the first dimension. After running this procedure with the first dimension, the algorithm is applied to the next dimension wherein the first dimension can be omitted in the further mining process. Recursively applying this procedure to every dimension, all frequent dimensions can be obtained.

Instead of mining for all patterns it can be more adequate to mine closed sequential patterns only, since they are the crucial part of all patterns. By means of an adapted version of the PrefixSpan algorithm closed sequential patterns can be detected.

In accordance to a further advantage of the present disclosure a ticket is automatically created in an issue tracking system in case of a matching pattern. Said ticket can be directed to a backend support team offering support for the occurred event. Additionally or alternatively, first diagnostic information or technical support might be offered automatically to the machine or rather the respective operating staff. The ticket may be a printed paper or a graphical representation supplied on a display device.

The use of multi-dimensional attributes also offers the opportunity to integrate non electronic parts reliability data in the logged event data of at least one machine. This enables the method to detect correlations between the found patterns and non electronic hardware failures of the machine.

In accordance with the present disclosure, the above-mentioned object is solved by a system comprising at least one machine, in particular a construction or hoisting machine, having data logging means for producing event data and a central processing unit for monitoring said at least one machine wherein said central unit is connected to a central pattern database. The central processing unit has means for receiving event data from at least one of the machines, means for mining a multi-dimensional sequential pattern within said received event data wherein at least one dimensional attribute holds information indicating said event data generating machine or at least one machine property, in particular the product family of the event data generating machine, and means for matching said mined multi-dimensional sequential pattern with patterns stored in a central pattern database.

The multi-dimensional attributes hold the information on the product family of the pattern generating machine. Mining multi-dimensional sequential patterns enables the central processor to detect patterns in a selection of machines and/or similar patterns within a product family and/or different product families having similar patterns.

At that point, the inventive system can monitor identical machines or differing machines of a single product family or similar product families. Moreover, by adding at least one attribute into the sequential patterns it is possible to describe the type and properties of machines supporting said sequential patterns. For example, the sequence patterns hold information about the event itself. Adding more attributes to the multi-dimensional patterns helps to provide additional information about the machine itself, for example at least one attribute describes the machine type, in particular a constructing or hoisting machine, at least one attribute identifies the membership to a special machine family, at least one attribute references the pattern to a special machine part, such as the machine drive, hydraulic system, mechanical parts, hoisting gear, etc.

Further, the system preferably comprises means for processing the above described inventive method. Obviously, the system shows the same advantages and properties as the inventive method.

Further, the present disclosure is also directed to a central processing unit for a system specified above which is suitable for performing the inventive method or a preferable example of said method.

Moreover, the present disclosure is directed to a computer usable medium having computer readable instructions stored thereon to be executed by a processor that performs the inventive method or an advantageous example of said inventive method.

Further details and advantages of the present disclosure will be explained in detail with reference to an example illustrated in the drawing.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
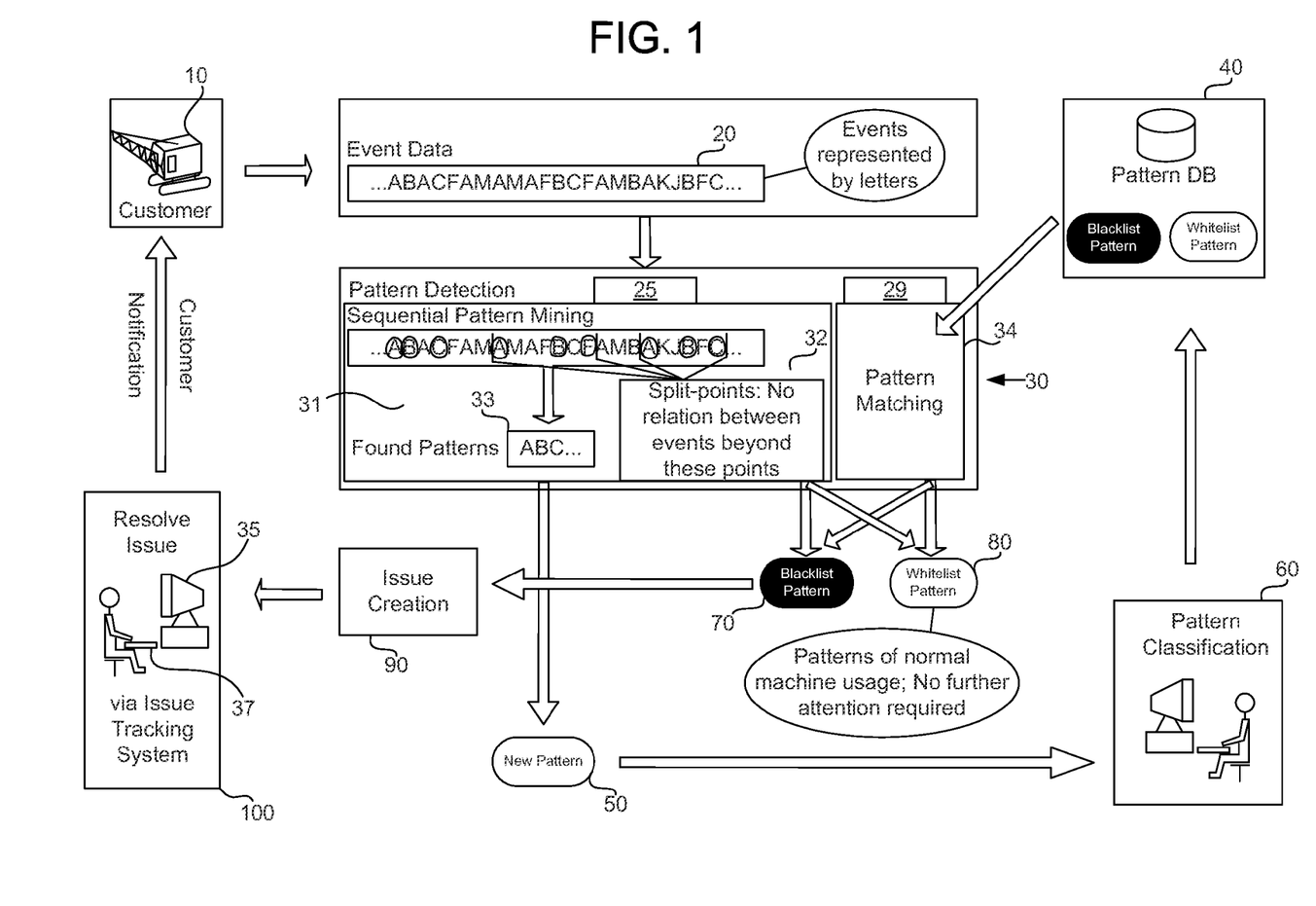
FIG. 1 shows a schematic overview over the inventive system.
Figure 2:
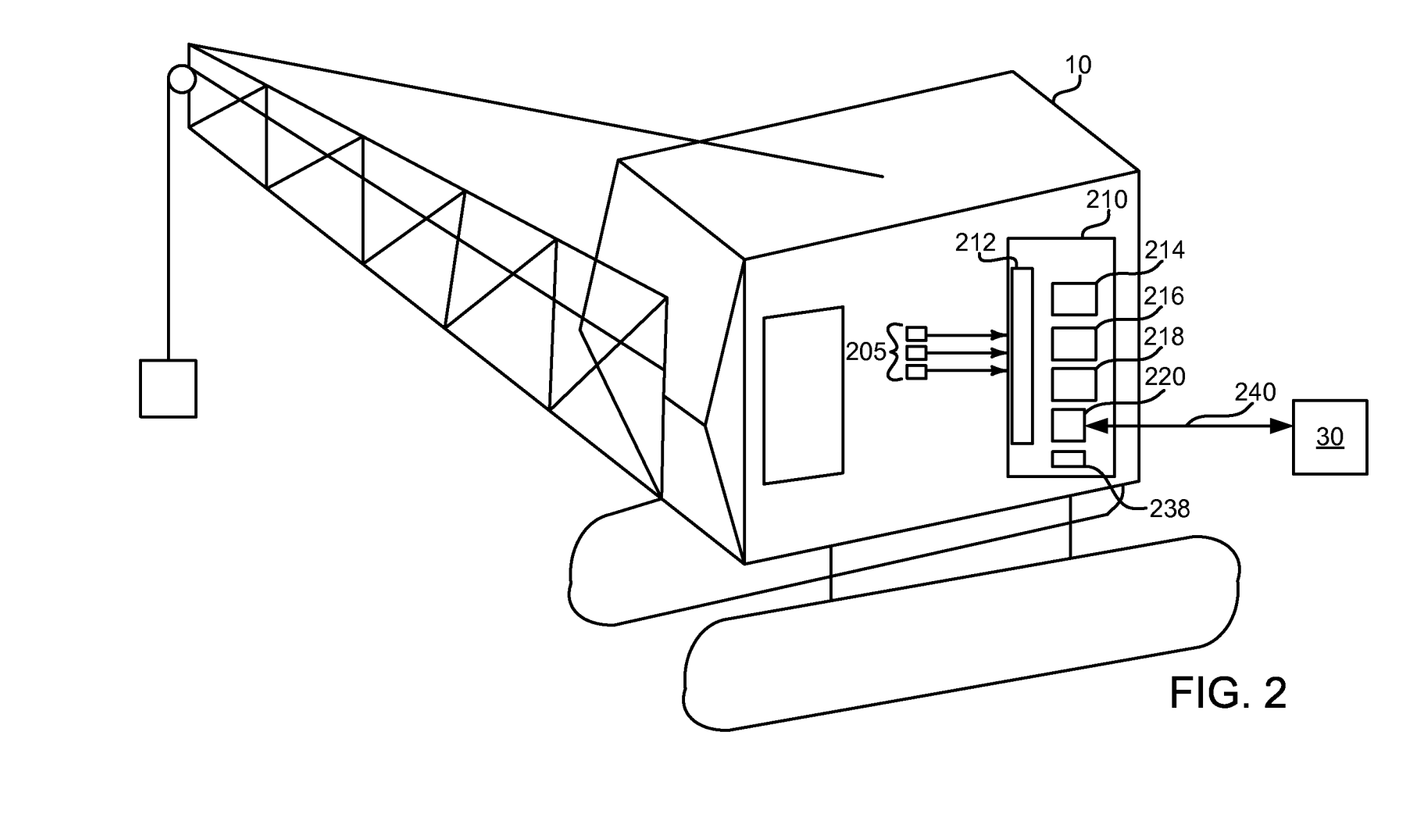
FIG. 2 shows a schematic view of an example event generating machine that provides event data.

The present description relates to monitoring event data for one or more event generating machines. In one example, the event generating machines may be construction or hoisting machines. FIG. 1 shows an example system where data are logged and then mined for information so that the possibility of machine degradation may be reduced. FIG. 2 shows an example machine which provides event data to a central processing unit. The system and method described herein provide a way to build a knowledge driven database useful for machine maintenance and operation.

It is deemed necessary to give a brief introduction into the terms of pattern mining in general before concentrating on the preferred example of the inventive system and its inventive method for monitoring a number of machines.

The following introduction is held very general using common definitions well known to those skilled persons working in the area of data mining.

I. Sequential Pattern Mining

Aside detecting items that frequently occur together at the same time as done by associated rule mining, it is also interesting to find associations between items which occur consecutively.

Sequential patterns provide more accurate information than association rules. Therefore, it is an important data mining technique and is applied in various fields, e.g. analysing customer behaviors, DNA sequences, web site access, just to name the most common.

Another new area, where sequential pattern mining shows enormous potential, is analysing event data coming from a data logging system.

As mentioned before, sequential pattern mining algorithms derive from association rule mining algorithms. The very first sequential pattern mining algorithm is AprioriAll, closely followed by GSP, both introduced by Rakesh Agrawal and Ramakrishnan Srikant. The aim to improve the mining process, brought forth a variety of algorithms, e.g. PrefixSpan, SPADE, CloSpan, just to name a few. In addition, algorithms were developed that satisfy certain constraints, e.g. MEMISP is a memory indexing approach, or SPIRIT employs regular expressions.

The major problem of sequential pattern mining is to examine a huge number of data records. The basic terms which are necessary to formally define sequential pattern mining are introduced in the following.

I.1 Definitions

Referring to the original introduction of Sequential Pattern Mining, given by Agrawal and Srikant, the original notation that stems from market basket analysis will be given. Later, differences will be pointed out and a solution for adapting this terminology to event data will be discussed.

Definition 1.3. (item)

Let each of the literals $i_1, \ldots, i_n$ represent an item. The set containing all items is denoted by I.

Remark 1.4.

The term item is used because in the field of market basket analysis, it's the items in the customer's baskets that receive the main focus of analysis.

Definition 1.5. (taxonomy)

Let T=(I,V) be a directed acyclic graph, with I being the previously defined set containing all items and V a list of pairs denoting all parent-child-relationships among elements of I. Thus T displays all taxonomies within I.

Remark 1.6

A pair $(i_1, i_2)$ in V means, that $i_1$ is a parent of $i_2$ or $i_2$ is a descendant of $i_1$.

Definition 1.7. (itemset, k-itemset)

Let $I=\{i_1, i_2, \ldots, i_n\}$ be the set containing all items. Every subset of I is referred to as itemset. If the cardinality of an itemset is k, it can be called k-itemset. An itemset is denoted as $(i_1, i_2, \ldots, i_m)$. For convenience, the parentheses are omitted if an element consists of one item only.

Remark 1.8

In the field of market basket analysis each itemset represents a transaction. Quantities of items are not considered.

Remark 1.9

There can only be one instance of an item in an itemset (since it is a set). However, instances of the same item can occur multiple times in different itemsets of the same sequence.

Definition 1.10. (sequence)

Let $s_j$ be an itemset, for all integers j, with $1 \leq j \leq l$. A sequence s represents a temporally ordered list of itemsets denoted by $s=\langle s_1 s_2 \ldots s_l \rangle$.

Remark 1.11. (element)

An itemset $s_j$ within a sequence is often referred to as element of the sequence.

Definition 1.12. (k-sequence)

The length of a sequence is defined as the sum of the cardinalities of the contained itemsets. A sequence having length k is denoted as k-sequence.

Definition 1.13. (subsequence, supersequence)

Let $s=\langle s_1 s_2 \ldots s_n \rangle$ and $s'=\langle s'_1 s'_2 \ldots s'_m \rangle$. s is a supersequence of s' and s' a subsequence of s, denoted by $s' \sqsubseteq s$, if there exist integers $1 \leq j_1 < j_2 < \ldots < j_m \leq n$ such that $s'_1 \subseteq s_{j1}$, $s'_2 \subseteq s_{j2}$, $s'_m \subseteq s_{jm}$.

Remark 1.14

If the items in an itemset are ordered according to a system (e.g. if items are represented by letters, it's natural to order them alphabetically), the notation of sequences becomes unique.

Definition 1.15. (sequence database)

A sequence database $\mathcal{S}$ is defined as a set of tuples $\langle sid, s \rangle$, where sid denotes a sequence id and s a sequence.

Definition 1.16. (contain)

Let s be a sequence and $\langle sid, s' \rangle$ a tuple of a sequence database. A tuple contains s if s is a subsequence of s'.

Definition 1.17. (support)

Let s be a sequence and $\mathcal{S}$ a sequence database. The support of s in $\mathcal{S}$ is defined as:

$$\text{support}_s(s) = |\{(sid,s') | (\langle sid,s' \rangle) \in s) \land (s \sqsubseteq s')\}|$$

Remark 1.18

It can be denoted as support(s) if the sequence database is clear from the context.

Definition 1.19. (sequential pattern)

Let min_support $\in \mathbb{N}$ (short for minimum support) be a support threshold. A sequence s is called a sequential pattern in a sequence database $\mathcal{S}$ if $\text{support}_s(s) \geq \text{min\_support}$.

Remark 1.20

Since a pattern is a special sequence, all definitions for sequences also hold for patterns.

Remark 1.21. (frequent sequence)

In the literature a sequential pattern is also referred to as a frequent sequence.

Definition 1.22. ($\mathcal{P}_\mathcal{S}$)

Let $\mathcal{P}_\mathcal{S}$ be the set containing all sequential patterns of a sequence database $\mathcal{S}$.

Corollary 1.23.

Given a sequential pattern $p=\langle s_1 \ldots s_n \rangle$ and a subpattern $p'=\langle s_1 \ldots s_m \rangle$, such that m<n. Then it is clear that support(p) $\leq$ support(p').

Definition 1.24. (cover)

The cover represents the set of all sequences in the sequence database where the pattern occurs. The cardinality of this set corresponds to the support of the pattern.

Definition 1.25. (support relationship)

Let $p=\langle s_1 \ldots s_n \rangle$ be a sequential pattern and $p'=\langle s_1 \ldots s_m \rangle$, be a subpattern. The support relationship is defined as support(p)/support(p').

Definition 1.26. (strong pattern)

A pattern is denoted a strong pattern if the support of every subpattern is equal to the support of the pattern itself.

Remark 1.27. (strong pattern)

In other words: In case the support relationship of every subpattern of a pattern p equals 1, then p is a strong pattern. The smaller the support relationship becomes, the less important is the very subpattern for the pattern.

Example 1.28. (sequence database)

Table 1.1 shows a sequence database, holding sales transaction records of a supermarket, for example.

TABLE 1.1

Sequence Database

| sid | Sequence |
|---|---|
| 10 | ⟨(bd)cb(ac)⟩ |
| 20 | ⟨(bf)(ce)b(fg)⟩ |
| 30 | ⟨(ah)(bf)abf⟩ |
| 40 | ⟨(be)(ce)d⟩ |
| 50 | ⟨a(bd)bcb(ade)⟩ |

The first row in the table could be read like this: Customer having id 10 bought on one visit items b and d. On his next visit he bought c alone. Then he acquired b. His next purchase was a together with c. The first row consists of four elements:

$$\langle (bd)\, c\, b\, (ac) \rangle,$$

It is a 6-sequence. Item b appears two times in this sequence and contributes 2 to the length of the sequence. Nevertheless it only contributes one to support(b).

Sequence $s=\langle (bd)cb \rangle$ is a subsequence of 10 and 50. Given min_support=2, s is furthermore a sequential pattern in this sequence database.

Definition 1.29. (sequential pattern mining)

Given a sequence database $\mathcal{S}$ and a min_support threshold, the process of detecting the set containing all sequential patterns in $\mathcal{S}$ is called sequential pattern mining.

1.2.2 Mining Closed and Maximal Sequential Patterns

The longest found frequent sequence contains a numerous amount of frequent subsequences, e.g. for a sequential pattern of length n, there exist $2^n-1$ nonempty subsequences. Sometimes it is prohibitively expensive to mine the complete set of patterns. Therefore one defined the following 2 subclasses of sequences:

Definition 1.30. (closed sequence)

A sequence s, having no supersequence of s with at least the same support as s is called a closed sequence.

Definition 1.31. $\mathcal{CP}_{\mathcal{S}}$

The set containing all closed sequential patterns is denoted by $$\mathcal{CP}_{\mathcal{S}} = \{\alpha | \alpha \in \mathcal{P}_{\mathcal{S}} \wedge (\nexists\, \beta \in \mathcal{P}_{\mathcal{S}} | \alpha \sqsubseteq \beta \wedge \text{support}_s(\alpha) = \text{support}_s(\beta))\}.$$

Definition 1.32. ( maximal sequence)

A sequence s that has no frequent supersequence is called a maximal sequence.

Remark 1.33.

The maximal sequences class is a subset of the closed sequences class and contains typically less sequences. The solution to the problem explained above is to mine maximal or closed frequent sequences (i.e. sequential patterns) only. The development of efficient algorithms for mining closed and maximal sequential patterns in large databases is an important research problem. There are yet only a few algorithms dealing with that problem, e.g. a PrefixSpan based approach called CloSpan.

II. PrefixSpan

PrefixSpan starts by detecting all the frequent items in a sequence database and then gets all the sequential patterns, by "growing" these items, i.e. adding items. To better describe the main idea of the algorithm it is helpful to define the following.

II.1 Idea of the Algorithm

Definition 2.1. (prefix)

Suppose all the items within an element are ordered (e.g. alphabetically). Given a sequence $\alpha=\langle e_1\, e_2\, \ldots\, e_n \rangle$ where each $e_i$ corresponds to a frequent element in $\mathcal{S}$, a sequence $\beta=\langle e'_1\, e'_2\, \ldots\, e'_m \rangle$ (m<n) is called a prefix of a if and only if
  i. $e'_i = e_i$ for (i≤m−1)
  ii. $e'_m \subseteq e_m$
  iii. all the frequent items in $(e_m - e'_m)$ are, based on the order (e.g. alphabetically), after those in $e'_m$ Example 2.2

Given a sequence $s=\langle a(abc)(ac)d(cf) \rangle$. Then $\langle a \rangle$, $\langle aa \rangle$, $\langle a(ab) \rangle$, $\langle a(abc) \rangle$ are prefixes of s, but $\langle ab \rangle$ and $\langle a(bc) \rangle$ are not.

Definition 2.3. (suffix)

Given a sequence $\alpha=\langle e_1\, e_2\, \ldots\, e_n \rangle$, where each $e_i$ corresponds to a frequent element in $\mathcal{S}$. Let $\beta=\langle e_1\, e_2\, \ldots\, e_{m-1}\, e'_m \rangle$ (m≤n) be the prefix of $\alpha$. Sequence $\gamma=\langle e''_m\, e_{m+1}\, \ldots\, e_n \rangle$ is called the suffix of $\alpha$ with regard to the prefix $\beta$, denoted as $\gamma = \alpha/\beta$, where $e''_m = (e_m - e'_m)$ (if $e''_m$ is not empty). We also denote $\alpha = \beta \cdot \gamma$.

Remark 2.4

If $\beta$ is not a subsequence of $\alpha$, the suffix of $\alpha$ with regard to $\beta$ is empty. It is intuitively clear that, following the order of the prefix of a frequent sequence and projecting only suffixes of that sequence (aka. projected sequence databases of the prefix), one can examine all the relevant subsequences for further pattern growth.

Based on that intuitive concept, the algorithm recursively projects a sequence database into a set of smaller, projected sequence databases according to the prefixes, which are the set of patterns mined so far. Then it grows these already found (and used as prefixes) sequential patterns by detecting frequent items in each of the corresponding projected databases and adds them at the end of the already found patterns.

Example 2.5

The sequential pattern $\langle ab \rangle$ in the sequence database $\mathcal{S}$ would be detected by PrefixSpan as follows:

i. a is identified as a frequent item in $\mathcal{S}$.

ii. in all the sequences of $\mathcal{S}$ starting with a (i.e. the $\langle a \rangle$ -projected sequence database) b is a frequent item.

iii. b is added to the prefix, i.e. a, and $\langle ab \rangle$ is stored as a pattern.

The next step would be scanning the $\langle ab \rangle$ -projected sequence database to scan for sequential 3-patterns having prefix $\langle ab \rangle$. This approach is based on the FreeSpan algorithm, which creates projected databases based on the current set of frequent patterns without a particular ordering (i.e. growth direction). PrefixSpan employs ordered growth by frequent prefix ordered expansion, which turns out to improve the performance of the algorithm. PrefixSpan mines the complete set of sequential patterns. Since it does not apply candidate generation and testing, which is an expensive operation PrefixSpan outperforms the Apriori based algorithms like GSP.

II.2 Essential Results and Definitions

Lemma 2.6

Let $\{\langle x_1 \rangle, \langle x_2 \rangle, \ldots, \langle x_n \rangle\}$ be the complete set of length-1 sequential patterns in a sequence database $\mathcal{S}$. The complete set of sequential patterns in $\mathcal{S}$ can be divided into n disjoint subsets. The $i^{th}$ subset (1≤i≤n) is the set of sequential patterns with prefix $\langle x_i \rangle$.

Let $\alpha$ be a length-l sequential pattern and $\{\beta_1, \beta_2, \ldots, \beta_m\}$ be the set of all length-(l+1) sequential patterns with prefix $\alpha$. The complete set of sequential patterns with prefix $\alpha$, except for a itself, can be divided into m disjoint subsets. The $j^{th}$ subset (1≤j≤m) is the set of sequential patterns prefixed with $\beta_j$.

Proof only ii. is verified, because i. is a special case where $\alpha=\langle\ \rangle$. For a sequential pattern $\gamma$ with prefix $\alpha$, where the length of $\alpha$ equals l, it is clear that the length-(l+1) prefix of $\gamma$ is a sequential pattern, as well. Furthermore, the length-(l+1) prefix of $\gamma$ has the same prefix $\alpha$, according to Definition 2.1. Hence, there exists an index j(1≤j≤m) such that $\beta_j$ is the length (l+1) prefix of $\gamma$. Thus, $\gamma$ is an element of the $j^{th}$ subset. Since the length-k prefix of a sequence γ is unique (cf. Remark 1.14) γ belongs to one determined subset only. As a result the subsets are disjoint.

Thanks to Lemma 2.6, the problem of sequential pattern mining can be handled recursively. Each subset of sequential patterns can be divided by means of their prefixes. This approach creates a divide-and-conquer framework, which is employed in the PrefixSpan algorithm. For the formally correct usage of this idea, one defined the following.

Definition 2.7. (projected database)

Let α be a sequential pattern in a Sequence database s. The α-projected database, denoted as $\mathcal{S}|_α$, is the set containing all suffixes of sequences in $\mathcal{S}$ with prefix α.

Definition 2.8. (support count in projected database)

Let α be a sequential pattern in sequence database $\mathcal{S}$, and β be a sequence with prefix α. The support count of β in the α-projected database $\mathcal{S}|_α$, denoted as $support_{s|_α}(β)$, is the number of sequences γ in $\mathcal{S}|_α$ such that $β \sqsubseteq α·γ$.

Lemma 2.9

Let α and β be two sequential patterns in a sequence database $\mathcal{S}$ such that α is a prefix of β.

i. $\mathcal{S}|β = (\mathcal{S}|_α)|_β$
ii. for any sequence γ with prefix α, $support_s(γ) = support_{s|_α}(γ)$, and
iii. the size of α-projected database cannot exceed that of $\mathcal{S}$.

Proof. (sketch)

This proposition is clear since for a sequence γ the suffix of γ with regard to β (γ/β) equals the sequence resulting from first projecting γ with regard to α (i.e. γ/α) and then projecting γ/α according to β. Hence, it is obtained γ/β=(γ/α)/β, which yields the statement to be demonstrated.

In order to determine the support count of a sequence γ, one only needs to consider the sequences in the database sharing the same prefix. Then, only the corresponding suffixes which form a super-sequence of γ need to be counted. It is clear that by this way of counting one gets the number of appearances of γ in $\mathcal{S}$.

Obviously, the α-projected database contains the same number of sequences as $\mathcal{S}$ if a appears in every sequence in $\mathcal{S}$. Otherwise, only those sequences in $\mathcal{S}$ with prefix α appear in the α-projected database. Therefore, the α-projected database cannot contain more sequences than $\mathcal{S}$.

III.3 The Algorithm

Input: A sequence database $\mathcal{S}$, and the minimum support threshold min_support.

Output: The complete set of sequential patterns.

Main Method: PrefixSpan(α,l,$\mathcal{S}|_α$) with:
α: a sequential pattern.
l: the length of a.
$\mathcal{S}|_α$: the α-projected database if α≠⟨ ⟩, otherwise it is the sequence database $\mathcal{S}$.

The procedure of the algorithm's main Method in detail:

i. Scan $\mathcal{S}|_α$ once to find every frequent item, represented here by d.
ii. Add each frequent item d to a to form a sequential pattern α' by:
   (a) assembling d to the last element of a to form a sequential pattern (e.g. if α=⟨a(bc)⟩ the result would be α=⟨a(bcd)⟩; or
   (b) appending ⟨d⟩ to α to form a sequential pattern (the result would be α=⟨a(bc)d⟩.
   iii. Output the just found sequential pattern α'.
   iv. For each α', the α'-projected database $\mathcal{S}|_α$ is generated, and PrefixSpan(α', l+1, $\mathcal{S}|_α$) is applied.

The algorithm is started by calling the main method with the following arguments:

PrefixSpan(⟨ ⟩,0,$\mathcal{S}$), and continues recursively until all sequential patterns are identified.

Theorem 2.10. (PrefixSpan)

A sequence α is a sequential pattern if and only if PrefixSpan identifies it as such.

Proof. (Sketch)

"⇒":

Let l be an integer with (l≥1). PrefixSpan identifies a length-l sequence α as sequential pattern only if α is a sequential pattern in the projected database of its length-(l−1) prefix $\hat{α}$. In case l=1, the length-0 prefix of α, $\hat{α}$=⟨ ⟩. Hence the corresponding projected database is the whole sequence database s. Therefore α is a sequential pattern in $\mathcal{S}$. In case l>1, $\mathcal{S}|_α$ represents the $\hat{α}$-projected database. By means of Lemma 2.9, it can be determined that $support_s(α) = support_{s|\hat{α}}(α)$. With a being a sequential pattern in $\mathcal{S}|_α$, it is automatically a sequential pattern in $\mathcal{S}$ as well. Now it is clear that a sequence α is a sequential pattern if PrefixSpan identifies it as such.

"⇐":

Lemma 2.6 assures that every sequential pattern, out of the complete set of sequential patterns in $\mathcal{S}$, is discovered by the PrefixSpan algorithm, which was to be demonstrated.

Remark 2.11

Instead of performing physical projections, one can register indices (or identifiers) of the corresponding sequence and the starting position of the projected suffix in the sequence. This pseudo projection technique reduces the costs of projecting considerably, if the projected database can fit in main memory.

III.3.1 why PrefixSpan is Performant

The major advantages of PrefixSpan are:

No candidate sequence needs to be generated and tested by PrefixSpan. Unlike Apriori based algorithms, the projected databases of PrefixSpan, for a sequential pattern α, contain only the necessary information for mining the sequential patterns that can grow from α. It neither generates nor tests any candidate sequence nonexistent in the sequence database. Compared with GSP, which generates and tests a substantial number of candidate sequences, PrefixSpan searches a much smaller amount of database entries.

The search space of PrefixSpan is effectively reduced to a set of projected databases. PrefixSpan just counts the frequency of local (i.e. in the projected database) items. This is in sharp contrast to the Apriori based algorithms, which scan the original database in every iteration step. Therefore many irrelevant sequences have to be checked in the Apriori approach, which adds to the overhead.

As indicated in Lemma 2.9, a projected database is smaller than the original. This is because only the suffix subsequences of a frequent prefix are projected into a projected database. In practice, the shrinking factors can be significant because usually, only a small set of sequential patterns grows quite long in a sequence database. Thus, the size of the projected databases reduces quickly as the algorithm proceeds to longer sequential patterns.

Remark 2.12

The major cost of PrefixSpan lies in the construction of projected databases. In the worst case, PrefixSpan constructs a projected database for every sequential pattern. Still this is an advantage compared to the Apriori approach, since they pass over the whole data in every iteration.

Remark 2.13

When min_support drops, the number of frequent sequences grows up exponentially. The handling of such an exponentially growing number is hard to handle for candidate generating and testing based algorithms, e.g. GSP.

II.4 CloSpan

Is a variation of PrefixSpan to mine closed patterns.

III. Multi-Dimensional Sequential Pattern Mining

In the process of mining more precise and suitable sequential patterns, one came up with the idea of considering more attributes in the sequential patterns. This field is called Multi-Dimensional Sequential Pattern Mining.

For example, a sequence database contains transactional data. Sequential Pattern mining would dig up that a significant amount of people that buy product A are likely to buy product B within a certain time interval. Multi-Dimensional sequential pattern mining tries to describe the group of people supporting this pattern in more detail by adding additional attributes, such as age, profession, address, etc. Hence, groups of people having different purchasing behaviours can be detected.

III.1 Definitions

Definition 3.1. (Multi-Dimensional Sequence Database)

A sequence database having rows of the form (dID, $D_1, \ldots, D_m$, s), with dID being a primary key, $D_1, \ldots, D_m$ additional attributes/dimensions and s a sequence, is called a multi-dimensional sequence database.

Definition 3.2. (multi-dimensional sequence)

Let * be a meta-symbol not belonging to any dimension $D_1, \ldots, D_m$. A multi-dimensional sequence has the form $(d_1, \ldots, d_m, s)$, with $d_i \in (D_i \cap \{*\})$, $(1 \le i \le m)$ and s a sequence.

Definition 3.3. (match)

A multi-dimensional sequence $p=(d_1, \ldots, d_m, s)$ is said to match a tuple $t=(x_1, \ldots, x_m, s_t)$ in a multi-dimensional sequence database if and only if, for $(1 \le i \le m)$, either $a_i = x_i$ or $a_i = *$, and $s \sqsubseteq s_t$.

TABLE 3.1

Multi-Dimensional Sequence Database

| Customer ID | Customer Group | Hometown | Age Group | Sequence |
|---|---|---|---|---|
| 10 | Business | Houston | Middle | ⟨(bd)cb(ac)⟩ |
| 20 | Professional | San Antonio | Young | ⟨(bf)(ce)b(fg)⟩ |
| 30 | Business | Galveston | Middle | ⟨(ah)(bf)abf⟩ |
| 40 | Education | Austin | Retired | ⟨(be)(ce)d⟩ |
| 50 | Professional | Houston | Young | ⟨a(bd)bcb(ade)⟩ |

Aside this new definitions all the usual definitions, as introduced under pint I. and II. hold.

III.2 Algorithms

In this section a direct extension of the PrefixSpan algorithm is briefly presented and two approaches that combine PrefixSpan and BUC (Bottom Up Computation)-like algorithms to mine multi-dimensional sequential patterns.

III.2.1 UniSeq

The main idea of the UniSeq (Uniform Sequential) approach is to embed the additional attributes as new itemset into the sequence, called MD-extension of the sequence. Thus, a sequential database is obtained, which can be mined by means of PrefixSpan.

TABLE 3.2

Embedded additional information as itemsets into the sequences

| Customer ID | MD-extension of sequences |
|---|---|
| 10 | ⟨(Business, Houston, Middle)(bd)cb(ac)⟩ |
| 20 | ⟨(Professional, San Antonio, Young)(bf)(ce)b(fg)⟩ |
| 30 | ⟨(Business, Galveston, Middle)(ah)(bf)abf⟩ |
| 40 | ⟨(Education, Austin, Retired)(be)(ce)d⟩ |
| 50 | ⟨(Professional, Houston, Young)a(bd)bcb(ade)⟩ |

Since point II. it is clear that PrefixSpan will find all the frequent dimensions and its patterns in that sequence database. It is convenient, that UniSeq reduces the problem of mining multi-dimensional sequential patterns to mining sequential patterns with one additional itemset. Therefore, it is easy to implement. However, treating the dimensions as itemsets, is not the most efficient way to detect frequent attributes. Especially when the number of dimensions increases this method becomes inefficient.

Example 3.4

Given a minimum support of 2, the sequence p=(*, Houston, *, ⟨(bd)cb⟩) is a multi-dimensional sequential pattern in the sequence database of Table 3.2.

III.3 Dim-Seq vs. Seq-Dim

Every row a multi-dimensional sequence database can be represented by a multi-dimensional sequence $r=(x_1, \ldots, x_m, s_r)$ which consists of two parts: the dimensional information $(x_1, \ldots, x_m)$ and a sequence $s_r$. Thus, it seems obvious to partition the problem of multi-dimensional sequential pattern mining to two sub-problems:

detect frequent dimensional attributes mine for sequential patterns.

The sequential pattern mining part can be conducted by PrefixSpan. For detecting the frequent dimensional attributes a BUC (Bottom Up Computation)-like algorithm, where BUC is an efficient iceberg cube computing algorithm developed in, is adapted. The general idea of the BUC-like algorithm is:

Take the first dimension and order it alphabetically. Find all entries in this dimension that appear at least as often as minimum support demands.

Just like in PrefixSpan, try to grow these frequent dimensional attributes by taking the corresponding entries of the next dimension (similar to projected database in PrefixSpan) and scan far attributes appearing at least as often as minimum support.

Continuing in that matter, all frequent dimensions containing an item (not '*') in the first dimension. After running this procedure with the first dimension, we can omit that dimension in the further mining process (i.e. represent it as * in the multi-dimensional sequence) and apply the algorithm to the second dimension. Recursively applying this procedure to every dimension, all the frequent dimensions can be obtained.

There are two algorithms employing this approach, differing in which sub-problem should be solved first.

III.3.1 Dim-Seq

Dim-Seq detects frequent dimensional attributes first and then mines for sequential patterns in the corresponding sequences.

III.3.2 Seq-Dim

First mine sequential patterns in the sequences and then detect frequent dimensional attributes.

III.4 Conclusion

As a result, Dim-Seq performed worst. Different dimension combinations feature many common sequences, but the method cannot efficiently cope with that. UniSeq is fastest with data having only a few dimensional attribute combinations. That's because BUC-like mining has hardly an advantage when there are just a few dimensional attributes. However, UniSeq's detriment is the cost of mining dimensional attributes. Seq-Dim is the most efficient and fastest approach in general and outperforms the other two in most cases. The great advantage of Seq-Dim is the fact that it mines the sequential patterns first and the little remaining dimensional attributes, to mine in the second step, save a lot of computation power.

IV. Preferred Embodiment

In the following it is pointed out how to employ and adapt the aforementioned methods in a system for monitoring a number of machines, in particular construction or hoisting machines, having data logging means for providing event data according to the present disclosure. Said system can be seen in FIG. 1.

Data consisting of temporally ordered status information is defined as event data. Almost any type of information provided with a timestamp meets this definition.

Usually, event data is recorded at an elementary level of a computer based system in order to observe its behaviour. Though, there is no standard form of event data, it is often recorded in logs. Nowadays, companies and organizations generate terabytes of event data on a daily basis.

FIG. 1 shows an event generating machine 10. In this example, the event generating machine is a construction or hoisting machine, employing a data logging software stored as non-transitory executable instructions on its PLC (Programmable Logic Controller). In one specific example, the event generating machine 10 may be a crane or a port crane. The data logging software records event data generated by running programs and sensors. This data makes it possible to monitor the status of the crane. Hence, the ability to automatically store and monitor event data records on a permanent basis has become a necessity for detecting malicious behaviour, hazard states and other security issues.

The event generating machine 10 stands representatively for an arbitrary number of cranes or constructing machines or a fleet thereof. The cranes may be identical or rather similar. Preferably, they all belong to a common product family or similar product families.

The logged event data contains single events which are represented by letters. Said event data is shown at block 20 and is transferred to a central processing unit 30.

Said central processing unit 30 comprises a sequence database 25 and non-transitory executable instructions 31 for sequential pattern mining By way of said pattern mining instructions 31 all relevant relations/patterns within the event data should be detected. These patterns present a salient part of the data that needs to be analysed and rated. Furthermore, one can identify the correlation between the patterns and the hardware of the event generating machine and thus provide an automatic approach to preventive maintenance for the event generating machine.

To enable sequential pattern mining instructions 31 the event data has to be transformed into a sequence database 25 firstly. A general form of event data consists of the following basic columns:

Event ID: a unique number, referencing an entry.
Timestamp: giving the exact time of the event.
Type of Event: describes the event.

Is event First after Boot: a Boolean value giving information of whether this event is the first since booting the system.

Values: values that cohere with the event.

A single record holds information on the event that occurred on the device in question at the Date, given by the timestamp, plus values describing the event in more detail. E.g. at a special timestamp, the Load Spectrum Counters (LSC) of the event generating machine 10 were read out, plus the actual values of the LSC. Hence, the event data shows the history of states the device was in.

An example of possible logged event data generated on the event generating machine 10 employing a data logger is given in table 4.1. For reasons of simplicity, the value column is omitted in this example.

TABLE 4.1

Event Data

| Event ID | Timestamp | Type of Event | First after Boot |
|---|---|---|---|
| 3745 | 2007-12-7T10:23:14 | b | 1 |
| 3746 | 2007-12-7T10:23:14 | d | 0 |
| 3747 | 2007-12-7T10:24:12 | c | 0 |
| 3748 | 2007-12-7T10:24:12 | b | 0 |
| 3749 | 2007-12-7T10:25:10 | a | 0 |
| 3750 | 2007-12-7T10:25:10 | c | 0 |
| 3751 | 2007-12-7T14:12:03 | b | 0 |
| 3752 | 2007-12-7T14:12:03 | f | 0 |
| 3753 | 2007-12-7T14:12:13 | c | 0 |
| 3754 | 2007-12-7T14:12:13 | e | 0 |
| 3755 | 2007-12-7T14:13:01 | b | 0 |
| 3756 | 2007-12-7T14:13:57 | f | 0 |
| 3757 | 2007-12-7T14:13:57 | g | 0 |
| 3758 | 2007-12-8T09:01:23 | a | 1 |
| 3759 | 2007-12-8T09:01:23 | h | 0 |
| 3760 | 2007-12-8T09:02:04 | b | 0 |
| 3761 | 2007-12-8T09:02:04 | f | 0 |
| 3762 | 2007-12-8T09:03:14 | a | 0 |
| 3763 | 2007-12-8T09:03:23 | b | 0 |
| 3764 | 2007-12-8T09:03:42 | f | 0 |
| 3765 | 2007-12-8T09:04:26 | b | 1 |
| 3766 | 2007-12-8T09:04:26 | e | 0 |
| 3767 | 2007-12-8T09:05:03 | c | 0 |
| 3768 | 2007-12-8T09:05:03 | e | 0 |
| 3769 | 2007-12-8T09:05:51 | d | 0 |
| 3770 | 2007-12-8T11:03:34 | a | 0 |
| 3771 | 2007-12-8T11:04:17 | b | 0 |
| 3772 | 2007-12-8T11:04:17 | d | 0 |
| 3773 | 2007-12-8T11:05:21 | b | 0 |
| 3774 | 2007-12-8T11:05:58 | c | 0 |
| 3775 | 2007-12-8T11:06:47 | b | 0 |
| 3776 | 2007-12-8T11:07:11 | a | 0 |
| 3777 | 2007-12-8T11:07:11 | d | 0 |
| 3778 | 2007-12-8T11:07:11 | e | 0 |

Though the data contains events having the same timestamp, they actually appear successively. Unfortunately the data logger is not accurate enough to record the time difference between extraordinary close events. But thanks to the consecutively numbered Event id, even two close events, are recorded in the actual temporally order.

Basically an event data, like above, simply represents one long sequence. The splitting of the shown sequence results in five subsequences, which then form a sequence database. The splits are given either by logical interruptions e.g. a restart of the machine, or causal breaks e.g. an interval with no occurring events, exceeding a given time threshold. In Table 4.1 it can be seen that subsequences starting with Event IDs 3745, 3758 and 3765 have been split due to a reboot of the machine. Subsequences starting with Event IDs 3751 and 3770 have been split due to causal breaks. The splitting takes place in block 32 of FIG. 1.

Talking about sequential pattern mining in the field of event data, the term event replaces the term item according to point I.1. Hence, event sets would represent events occurring at the same time. Since the event generating machine 10 only has one status at a time, there are no k-event sets with k>1. Thus, a sequence consists of events only.

A sequence of events is called connected, if none of the above split criteria partitions the sequence.

Applying the split rules as explained above (given a time threshold of an hour) to the event data of Table 4.1, the following sequence database can be determined:

TABLE 4.2

| sid | Sequence |
|---|---|
| 1594 | ⟨b d c b a c⟩ |
| 1595 | ⟨b f c e b f g⟩ |
| 1596 | ⟨a h b f a b f⟩ |
| 1597 | ⟨b e c e d⟩ |
| 1598 | ⟨a b d b c b a d e⟩ |

The first row of Table 4.2 can be interpreted as: The event generating machine 10 in question underwent in a special time interval, having id 1594, a connected sequence of the following events in temporally order: b, d, c, b, a, c.

In the following a promising approach to efficiently monitor the state of the event generating machine 10 is described. As stated previously, a handy way to analyze event data is sequential pattern mining Instead of mining for all the patterns, it is more adequate to mine closed sequential patterns (reference is made to Definition 1.30 under point I.1) only, since they are the crucial part of all patterns. By means of an adapted version of the PrefixSpan (reference is made to point II.) algorithm (might be changed to CloSpan due to performance issues) closed sequential patterns can be detected.

To provide ease of use, all the parameters are computed automatically. All found patterns of a machine are stored in a multi-dimensional sequence database, where each sequence represents a pattern. The dimensional attributes hold the information on the product family of the pattern generating machine.

By means of mining multi-dimensional closed sequential patterns on this database, detection of patterns in a selection of machines, similar patterns within a product family, different product families having similar patterns is enabled.

For example, a event generating machine 10 has pattern $p_1$ and another event generating machine 10' (not depicted in FIG. 1) has the pattern $p_2$. Furthermore, there is a subpattern p of $p_1$ and $p_2$. Hence, it can be stated that the event generating machine selection of 10 and 10' shares the pattern p.

The multidimensional patterns are mined by means of a Seq-Dim (reference is made to point III.3.2) based algorithm.

The automated analysis method for preventive maintenance is based on the mentioned sequential pattern mining on event data. The main step of this method is to automatically detect patterns 33 in central processing unit 30 on every newly received data 20 from the event generating machine 10. The pattern detection process consists of two main analyses:

sequential pattern mining 31, i.e. finding new patterns within the received data 20; and pattern matching 34, i.e. searching for an already known pattern in the newly received data 20.

The newly found sequential patterns 50 are stored in a central pattern database 40 which is connected to the central processing unit 30. The newly found sequential patterns 50, whitelist patterns 80, blacklist patterns 70, issues, non-transitory executable instructions, tickets, and other system features are available to technicians 60 via display 35. Technicians may also manually enter patterns via manual input device 37, and display 35 may present messages when patterns stored in the central pattern database match mined multi-dimensional sequential patterns. Manual input device 37 may be a keyboard, audio input, or other device.

Subsequently, technicians 60 rate the severity of these newly found sequential patterns 50 and, in case, provide tips of how to resolve these issues. Patterns rated as severe are stored as blacklist patterns 70 and all others as whitelist patterns 80.

Aside the patterns 33 found by means of sequential pattern mining, there are patterns one already knows about in the first place. These patterns are inserted manually into the pattern database 40.

As a result, all the stored and classified patterns 70, 80 in the pattern database 40 can be matched 34 in every newly received data 20. In case a matched pattern is blacklisted, a ticket is created in an issue tracking system 90, requesting action from the after sales service team 100. Thus, the service team 100 is able to start resolving the issue before it becomes severe and stops or harms the machine.

The pattern detection process is stored as executable instructions in non-transitory memory 29 of central processing unit 30, as are instructions for matching patterns, storing blacklists, storing whitelists, displaying service requests, entering new patterns, retrieving patterns from a central database, mining data from event generating machines, and the other central processor functions described herein.

Furthermore, non electronic parts reliability data (NPRD) can be integrated in the event data of the machine which enables detection of correlations between the found patterns and non electronic hardware failures of the crane.

FIG. 2 shows an example construction or hoisting machine 10. The construction or hoisting machine includes sensors 205 and a controller 210. In one example, controller 210 is a PLC. Controller 210 includes input/output ports 212 for receiving data from sensors 205. Controller 210 also includes processor 214, data logger 238, non-transitory memory 216, transitory memory 218, and communications port 220. Non-transitory memory 216 includes executable instructions for logging sensor data and transmitting logged event data to central processing unit 30 via communication link 240. Communications link 240 may be wired or wireless.

The invention claimed is:

1. A method for monitoring at least one event data generating machine including a data logging device for providing event data, the method comprising:
    transferring logged event data, the logged event data representing a sequence of events, from at least one of the event data generating machines to a central processor;
    mining a multi-dimensional sequential pattern within said transferred event data wherein at least one dimensional attribute holds information indicating said event data generating machine or at least one event data generating machine property; and
    matching said mined multi-dimensional sequential pattern with patterns stored in a central pattern database.

2. The method according to claim 1, wherein a mined multi-dimensional pattern is stored in said central pattern database when it does not match a known stored pattern.

3. The method according to claim 1, wherein the patterns stored in said central pattern database are classified with respect to their severity.

4. The method according to claim 1, further comprising manually inserting patterns into said central pattern database.

5. The method according to claim 1, wherein a single event of said event data consists of at least one of the information fields Event ID, Timestamp, Type of Event and optional Boolean values or values cohering with the very event.

6. The method according to claim 1, wherein the transferred event data is transformed to a sequence database by multiple splitting of a long sequence of event data into at least two subsequences.

7. The method according to claim 6, wherein the multiple splitting is triggered by logical interruptions.

8. The method according to claim 6, wherein the multiple splitting is triggered by causal interruptions.

9. The method according to claim 1, wherein multi-dimensional mining is based on a Seq-Dim algorithm and/or a Dim-Seq algorithm and/or a UniSeq algorithm.

10. The method according to claim 9, wherein the Seq-Dim algorithm and/or the Dim-Seq algorithm and/or the UniSeq algorithm comprises steps of mining sequential patterns by a PrefixSpan algorithm or an adapted version of the PrefixSpan algorithm firstly and detecting frequent dimensional attributes by a BUC-like algorithm (Bottom Up Computation) afterwards.

11. The method according to claim 1, wherein closed sequential patterns are mined via an adapted version of a PrefixSpan algorithm, preferably a CloSpan algorithm.

12. The method according to claim 1, further comprising automatically producing a ticket in an issue tracking system for requesting action from a support team and/or for providing further diagnostic information in response to a newly detected pattern in the event data.

13. The method according to claim 1, wherein non electronic parts reliability data is integrated in the logged event data of at least one event data generating machine, and wherein the at least one event data generating machine is a construction or hoisting machine.

14. The method according to claim 1, wherein the at least one event data generating machine is a port crane or a deck crane, and further comprising servicing said event data generating machine based on said patterns stored in said central pattern database that match said mined multi-dimensional sequential pattern.

15. A system for monitoring at least one event generating machine, comprising:
at least one event generating machine including a data logger for producing event data representing a sequence of events;
a central pattern database;
a central processing unit including non-transitory executable instructions for receiving event data from the at least one event generating machine, said central processing unit including additional instructions for mining a multi-dimensional sequential pattern within said received event data wherein at least one dimensional attribute holds information indicating said at least one event data generating machine or at least one event generating machine property, and said central processing unit including additional instructions for matching said multi-dimensional sequential pattern with patterns stored in said central pattern database.

16. The system according to claim 15, further comprising central processing unit instructions for storing the mined multi-dimensional sequential pattern in said central pattern database when said multi-dimensional sequential pattern does not match a known stored pattern.

17. The system according to claim 15, further comprising central processing unit instructions for classifying the patterns stored in said central pattern database with respect to their severity.

18. The system according to claim 15, further comprising an issue tracking system for requesting action from a support team for preventive maintenance and wherein the issue tracking system includes non-transitory executable instructions for automatically creating a request for action when said multi-dimensional sequential pattern matches a severe rated pattern.

19. The system according to claim 15, wherein the at least one event generating machine is a port crane or a deck crane, and further comprising a display for presenting messages when said patterns stored in said central pattern database match said mined multi-dimensional sequential pattern.

20. A method for monitoring at least one construction and/or hoisting machine including a data logging device for providing event data, the method comprising:
transferring logged event data, the logged event data representing a sequence of events, from at least one of the machines to a central processor;
mining a multi-dimensional sequential pattern within said transferred event data wherein at least one dimensional attribute holds information indicating said machine or at least one machine property; and
matching said mined multi-dimensional sequential pattern with patterns stored in a central pattern database, wherein the patterns stored in the central pattern database are classified with respect to their severity, with severe patterns stored as blacklist patterns and all other patterns stored as whitelist patterns; and
requesting action from a service team when said mined multi-dimensional sequential pattern matches a blacklist pattern stored in the central pattern database.

* * * * *